United States Patent Office 3,419,393
Patented Dec. 31, 1968

3,419,393
CYCLIC THIOETHER SILVER HALIDE
DEVELOPMENT ACCELERATORS
John Martin Thompson and Alan Charles Farthing,
Eccles, England, assignors to Ilford Limited, Ilford,
Essex, England, a British company
No Drawing. Filed Feb. 17, 1966, Ser. No. 528,105
Claims priority, application Great Britain, Feb. 24, 1965,
7,995/65
5 Claims. (Cl. 96—66.3)

ABSTRACT OF THE DISCLOSURE

Process of developing a silver halide latent image in the presence of a compound of the general formula:

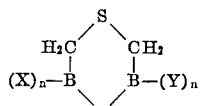

According to a first feature of the present invention there is provided a process for the production of a developed photographic material which comprises subjecting a material containing a developable silver salt to development by means of a photographic developing agent in the presence of a compound of the general Formula I:

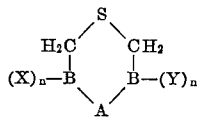    I where $n$ is 0 or 1, A being methylene and B being sulphur when $n$ is 0, and A being oxygen or sulphur and B being methine when $n$ is 1 and X and Y are the same or different and are each selected from hydrogen, alkyl, substituted alkyl, alkoxy, substituted alkoxy, aryl, substituted aryl, aryloxy, substituted aryloxy, or hydroxyl.

Alkyl groups when present preferably have up to six carbon atoms, i.e. methyl, ethyl, propyl, butyl, amyl, hexyl and their isomeric forms. Substituted alkyl groups may be any of the foregoing carrying, for example, halogen, hydroxyl, amino, cyano, carboxy, carbonamide, N-substituted carbonamide or sulphamoyl groups. Alkoxy groups when present may be similarly substituted. Aryl groups when present are preferably phenyl or homologues of phenyl and substituted aryl groups are preferably such groups carrying, for example, any of the substituent groups just referred to. Aryloxy groups when present may be similarly substituted.

Preferred compounds of general Formula I for use in the present invention are those in which A is a sulphur atom, B represents methine, X is hydrogen and Y is a substituted methyl group, the substituents being any of those referred to above.

Compounds of the foregoing formula are either known per se or are prepared by simple modification of known methods. The following Table I lists compounds suitable for use in the present invention, identifying them by reference to the foregoing Formula I and indicates in each a literature reference or a suitable method of preparation. Where the required end product is an amide it is convenient to prepare the corresponding acid and then to convert this to the acid chloride or lower alkyl ester and react it with ammonia or an amine. Where the required end product is a hydrazide the corresponding acid is prepared which is then converted to the lower alkyl ester and reacted with 60% hydrazine hydrate at room temperature.

TABLE I.—COMPOUNDS SUITABLE FOR USE IN THE INVENTION

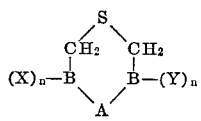

| Compound | A | B | Y | X | n | Preparation | B.P. (in °C./ mm.) | M.P. (in °C.) | Analysis | | | |
|---|---|---|---|---|---|---|---|---|---|---|---|---|
| | | | | | | | | | C | H | N | S |
| 1 | CH₂ | S | | | 0 | Commercially available | | | | | | |
| 2 | O | CH | H | H | 1 | do | | | | | | |
| 3 | O | CH | OH | OH | 1 | Coghill, J.A.C.S., 1937 59, 801. | | | | | | |
| 4 | O | CH | OEt | OEt | 1 | Coghill, J.A.C.S., 1937 59, 801. | | | | | | |
| 5 | O | CH | CH₃ | CH₃ | 1 | M. Hunt & C. S. Marrel, J.A.C.S., 1935 57, 1691. | | | | | | |
| 6 | S | CH | H | CH₂Cl | 1 | R. C. Fuson & A. J. Speziale, J.A.C.S., 1949 71, 1582. | | | | | | |
| 7 | S | CH | H | CH₂OH | 1 | R. C. Fuson & A. J. Speziale, J.A.C.S., 1949 71, 1592. | | | | | | |
| 8 | S | CH | H | CH₂NH₂ | 1 | Amination of (6) with aq. alcoholic NH₃ at 70° of. Note 2. | 120/0.2 | | F 40.9 R 40.2 | 7.8 7.4 | 8.5 9.5 | 43.2 42.9 |
| 9 | S | CH | H | CH₂CN | 1 | Reaction of (6) with aq. alcoholic NaCN under reflux of. Note 1. | 97/0.2 | 55–57 | F 45.4 R 45.4 | 6.1 5.7 | 8.4 8.8 | 39.9 40.1 |
| 10 | S | CH | H | CH₂CONH₂ | 1 | From the corresponding acid | | 124–126 | F 42.0 R 40.7 | 5.8 6.2 | | 36.6 36.2 |
| 11 | S | CH | H | —CH₂CONHCH₃ | 1 | From the corresponding acid as described in the text. | | 141 | F 43.6 R 44.0 | 6.6 6.8 | 7.4 7.3 | 33.9 33.5 |
| 12 | S | CH | N | —CH₂CONHNH₂ | 1 | do | | 118 | F 37.4 R 37.5 | 6.3 6.3 | 14.6 14.6 | 33.4 33.3 |

NOTE 1.—Organic syntheses, Collected Volume 2, p. 292 (1943).
NOTE 2.—Whitmore and Langlois, J.A.C.S., 1932, 54, 3441; Westphal and Jerchel, Ber., 1940, 73, 1002; V. Braun and Klor, Ber., 1940, 73, 1417.

It has been found that the presence of a compound of the said formula has a striking effect on photographic development in that when such a compound is present the time taken for development to a given density is much reduced. Specifically, when a photographic gelatino silver halide material, given a standard exposure, is developed to achieve a particular silver density in the exposed area then the development time taken to achieve that density is substantially reduced by the presence of the said compound.

Since one way of providing that a compound of Formula I is present during development of the photographic material is to provide that the said compound is included in the photographic material itself, the invention further includes novel photographic materials which comprise in a layer of the photographic material a compound of the general Formula I.

When the compound is included in the photographic material itself, it may be present in a light sensitive layer, e.g., a gelatino silver halide emulsion layer, or in any other layer of the photographic material, e.g., a sub-coat, supercoat or filter or anti-halation layer. The photographic material may be of a type adapted to be developed to yield colour images by reason of the presence of colour couplers in the photographic material itself or in a photographic developer used therewith.

The compound of the foregoing formula may alternatively be caused to be present during the development step by including it in the developer composition which is used or by treating the photographic material with a bath containing the compound before the development step.

The invention is of value in the production of photographic records in black and white and also in the production of photographic colour records. Its optimum point of use in the colour processing sequence will depend on the specific sequence employed. Thus where the photographic material is intended to be processed by a reversal procedure, i.e., the image-wise exposed material is first developed to give a silver image, the residual silver salt is rendered developable and the material is then developed in a second developer which image-wise develops a dye in the material (utilising colour couplers present in the photographic material or in the second developer) the compound of general formula I is preferably included in the first or so-called "reversal" developer.

In processes where the photographic material is designed to be directly developed to yield a colour image (utilising colour couplers present in the photographic material or in the colour developer) the compound of the foregoing Formula I is preferably included in the colour developer.

The term colour developers is used herein to mean an aromatic primary amino colour developing agent. Such compounds are normally N,N-disubstituted p-phenylene diamines or homologues thereof, the N-substituents being alkyl, or hydroxyalkyl groups.

The quantities of compound of general Formula I required to produce the optimum effect required vary from compound to compound. The optimum quantity for use in a developer solution either for colour or black and white materials lies normally within the range 0.0001 g. mol./liter to 0.5 g. mol./litre. When used as emulsion additives, the optimum quantities usually lie within the range 0.0001 g. mol. to 0.5 g. mol./g. mol. of silver halide.

The presence of a compound of general Formula I is found to have no deleterious effect on the coloured images obtained by either of the foregoing processes. Whilst the effect of the compounds is essentially to accelerate the development, it is possible by variations in conditions to utilise the effect of the compounds to establish desired variance in developed contrast or effective speed of the photographic sensitive layers. Moreover, advantage may be taken of the accelerative effect to reduce the quantity of silver present in the photographic emulsion, the same end result being achieved by the more effective utilisation of the reduced silver content, and this is, of course, an important economic advantage.

Further, the use of compounds of general Formula I makes possible the use of developers of inherently lower activity, thus making available a wider choice of developing substances of lower cost, higher solubility, lower toxicity or affording lower amounts of stain.

The following examples will serve to illustrate the invention:

EXAMPLE I

A colour photographic material constructed essentially as follows was employed:

(a) Blue-sensitive gelatino silver halide emulsion containing a colour coupler adapted to couple to yield a yellow dye.

(b) Green-sensitized gelatino silver halide emulsion containing colour coupler adapted to couple to yield a magenta dye.

(c) Red-sensitized gelatino silver halide emulsion containing a colour coupler adapted to couple to yield a cyan dye.

(d) Paper support layer.

A photographic colour print paper having a construction essentially as set out above, the layer (b) and (c) being gelatine silver chlorobromide emulsions, and with the emulsion layers and colour couplers designed to afford a good colour print material (such products being commercially available) was exposed to a colour negative transparency and developed in the following developers.

DEVELOPER 1

| | G. |
|---|---|
| Sodium hexametaphosphate | 2.0 |
| Trisodium citrate | 4.0 |
| Sodium metaborate | 5.3 |
| Sodium sulphite anhydrous | 4.0 |
| Potassium bromide | 1.0 |
| Sodium sulphate | 8.0 |
| Hydroxylamine hydrochloride | 2.0 |
| N-ethyl-N-(ω-hydroxy penta ethyl)-p-phenylene diamine | 5.8 |
| Water to 1 litre. | |

DEVELOPER 2

| | G. |
|---|---|
| Disodium salt of ethylene diamine tetraacetic acid | 1.0 |
| Sodium sulphite anhydrous | 4.0 |
| Sodium carbonate | 70.0 |
| Potassium bromide | 1.0 |
| Hydroxylamine hydrochloride | 2.0 |
| N-ethyl-N-(2-hydroxyethyl)-p-phenylene diamine | 4.5 |
| Water to 1 litre. | |

DEVELOPER 3

| | G. |
|---|---|
| Disodium salt of ethylene diamine tetraacetic acid | 1.0 |
| Sodium sulphite anhydrous | 2.0 |
| Sodium carbonate | 70.0 |
| Potassium bromide | 1.0 |
| Hydroxylamine hydrochloride | 2.0 |
| N-ethyl-N-(2-hydroxyethyl)-p-phenylene diamine | 4.5 |
| Water to 1 litre. | |

To these developers were added various quantities of compounds of general Formula I, as identified by the numbers assigned to them in the foregoing Table I.

The sensitometric results obtained are set out in Table II the times given being the times required to reach standard characteristics for a given exposure level. It will be noted that the fog levels are not materially increased by the presence of the compound of Formula I.

TABLE II.—COLOUR PAPER DEVELOPMENT

| Compound | Quantity, g. mol./l. | Time of Development, mins. | Fog | | | Relative Log Speed at Density 0.8 on the Characteristic Curve | | | Developer Used |
|---|---|---|---|---|---|---|---|---|---|
| | | | B | G | R | R | G | B | |
| Control | 0 | 8 | .10 | .06 | .06 | 1.80 | 1.73 | 1.73 | 1 |
| 1 | 0.0035 | 6 | .09 | .06 | .05 | 1.77 | 1.74 | 1.72 | 1 |
| 2 | 0.01 | 6 | .09 | .05 | .07 | 1.81 | 1.75 | 1.75 | 1 |
| 7 | 0.0033 | 6 | .15 | .20 | .10 | 1.81 | 1.77 | 1.75 | 1 |
| 10 | 0.01 | 6 | .08 | .06 | .07 | 1.81 | 1.74 | 1.72 | 1 |
| Control | 0 | 12 | .11 | .06 | .05 | 1.44 | 1.50 | 1.44 | 2 |
| 11 | .005 | 9 | .13 | .06 | .05 | 1.61 | 1.71 | 1.60 | 2 |
| | | 6 | .06 | .02 | .02 | 1.31 | 1.46 | 1.38 | 2 |
| 12 | .01 | 9 | .10 | .05 | .04 | 1.66 | 1.80 | 1.66 | 2 |
| | | 6 | .08 | .04 | .04 | 1.49 | 1.60 | 1.49 | 2 |
| Control | 0 | 9 | .13 | .03 | .03 | 1.85 | 1.71 | 1.60 | 3 |
| 12 | .01 | 5 | .15 | .08 | .07 | 1.83 | 1.80 | 1.65 | 3 |
| | .005 | 7 | .16 | .08 | .07 | 1.91 | 1.83 | 1.66 | 3 |
| | .002 | 7 | .14 | .05 | .04 | 1.88 | 1.76 | 1.60 | 3 |

EXAMPLE II

A film of the general construction indicating in Example I (but using a film support, having a yellow filter layer between layers (a) and (b), and designed as a camera material of speed ASA 64) was processed by the reversal method as follows:

The exposed film was first developed in the following Developer A.

DEVELOPER A

| | G. |
|---|---|
| 1-phenyl-3-pyrazolidone | 0.6 |
| Sodium sulphite (anhydrous) | 50 |
| Hydroquinone | 6.0 |
| Sodium metaborate | 20 |
| Potassium bromide | 2.0 |
| Potassium thiocyanate | 1.5 |
| Benztriazole | 0.4 |
| Water to make 1 litre. | |

The film was then put in a hardener bath for 2 minutes, washed for 5 minutes and re-exposed for 10 seconds with photoflood light. It was then colour developed in the following developer for 10 minutes at 20° C.

DEVELOPER B

| | G. |
|---|---|
| Sodium hexametaphosphate | 2.0 |
| Trisodium phosphate | 80 |
| Hydroxylamine sulphate | 2.4 |
| Sodium sulphite (anhydrous) | 4.0 |
| Potassium bromide | 0.5 |
| N - ethyl - N-hydroxyethyl-p-phenylene diamine acid sulphate | 7.8 |
| Water to make 1 litre. | |

The film was then put in a stop hardener bath for 3 minutes, washed for 3 minutes, bleached for 3 minutes, washed for 3 minutes, fixed for 4 minutes, and finally washed for 3 minutes, in the normal manner.

Various quantities of compounds of general Formula I were added to Developer A and the effects obtained are shown in the following Table II. The times noted are those required to reach a close match with the characeristics obtained by the control processing, for a given exposure level.

TABLE III.—REVERSAL DEVELOPMENT

| Compound | Quantity, g. mol./l. | Time of Development | Fog | | |
|---|---|---|---|---|---|
| | | | B | G | R |
| Control | 0 | 16 | .16 | .16 | .12 |
| 2 | 0.02 | 8 | .17 | .14 | .08 |
| 8 | 0.015 | 8 | .18 | .11 | .08 |
| 9 | 0.01 | 8 | .16 | .15 | .11 |

EXAMPLE III

Use of the compounds as emulsion additives

To a standard non-optically sensitised silver halide emulsion, a quantiy of compound 10 (Table I) is added. The quantity of compound is best taken in the proportion of 0.067 g. mol. per mol. of silver halide. To the emulsion is then added a suitable quantity of a solubilised long chain magenta colour former such as one of those described in British Patent No. 830,797. The emulsion is then coated on a paper support and the photographic element thus obtained is exposed and processed in the usual way for a paper containing a substantive colour former. By comparison with a control emulsion coating not containing the development accelerator it is found that for the same exposure level the additive reduces the required processing time to two thirds of standard.

We claim as our invention:

1. In a process for the production of a developed photographic material by subjecting a material containing a developable silver halide latent image to development by means of a photographic developing agent, the improvement comprising developing said silver salt by means of a said photographic developing agent in the presence of at least one compound of the formula:

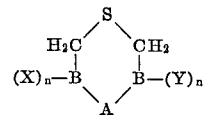

wherein $n$ is 0 or 1, when $n$ is 0, A is methylene and B is sulphur and when $n$ is 1, $a$ is selected from the group consisting of oxygen and sulphur and B is methine, and X and Y are each independently selected from the group consisting of hydrogen, alkyl, substituted alkyl, alkoxy, substituted alkoxy, aryl, substituted aryl, aryloxy, substituted aryloxy, and hydroxyl radicals.

2. A process according to claim 1 wherein said compound is present in the photographic developer.

3. A process according to claim 1 wherein said compound is present in a gelatino silver halide emulsion layer of the photographic material.

4. A photographic developer solution containing a silver halide developer and 0.0001 to 0.5 g. mol./liter of developer solution of at least one compound of the formula:

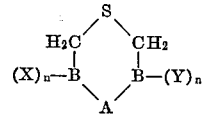

wherein $n$ is 0 or 1, when $n$ is 0, A is methylene and B is sulphur and when $n$ is 1, A is selected from the group consisting of oxygen and sulphur and B is methine, and X and Y are each independently selected from the group consisting of hydrogen, alkyl, substituted alkyl, alkoxy, substituted alkoxy, aryl, substituted aryl, aryloxy, substituted aryloxy, and hydroxyl radicals.

5. A gelatino silver halide emulsion containing 0.0001 to 0.5 g. mol./g.mol. of silver halide of a compound of the formula:

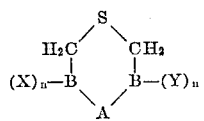

wherein $n$ is 0 or 1, when $n$ is 0, A is methylene and B is sulphur and when $n$ is 1, A is selected from the group consisting of oxygen and sulphur and B is methine, and X and Y are each independently selected from the group consisting of hydrogen, alkyl, substituted alkyl, alkoxy, substituted alkoxy, aryl, substituted aryl, aryloxy, substituted aryloxy, and hydroxyl radicals.

References Cited
UNITED STATES PATENTS

| | | | |
|---|---|---|---|
| 2,477,323 | 7/1949 | Wood | 96—66.3 |
| 3,053,656 | 9/1962 | Corley | 96—66.3 |
| 3,062,646 | 11/1962 | Dann et al. | 96—66.3 |

OTHER REFERENCES

Dalziel, J. A. W. et al., "Addition Compounds of 1, 3,5 Trithiane With Mercury (II) and Silver (I) Salts," J. Chem. Soc., O. Inorg. Phys. Theoret., 1966 (3), 233–5.

NORMAN G. TORCHIN, *Primary Examiner.*

C. E. DAVIS, *Assistant Examiner.*

U.S. Cl. X.R.

96—95; 107